(12) United States Patent
Moon et al.

(10) Patent No.: US 6,711,740 B1
(45) Date of Patent: Mar. 23, 2004

(54) GENERIC CODE BOOK COMPRESSION FOR XML BASED APPLICATION PROGRAMMING INTERFACES

(75) Inventors: Billy G. Moon, Morrisville, NC (US); John A. Toebes, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 204 days.

(21) Appl. No.: 10/047,110

(22) Filed: Jan. 17, 2002

(51) Int. Cl.[7] .................................................. G06F 9/00
(52) U.S. Cl. ........................................ 719/328; 709/230
(58) Field of Search ................................ 709/328, 329; 719/220–231

(56) References Cited

U.S. PATENT DOCUMENTS

| | | | |
|---|---|---|---|
| 6,167,448 A | * | 12/2000 | Hemphill et al. ............ 709/224 |
| 6,370,141 B1 | * | 4/2002 | Giordano et al. ............ 370/386 |
| 6,466,971 B1 | * | 10/2002 | Humpleman et al. ........ 709/220 |
| 6,546,419 B1 | * | 4/2003 | Humpleman et al. ........ 709/223 |
| 6,571,282 B1 | * | 5/2003 | Bowman-Amuah ......... 709/219 |
| 6,581,094 B1 | * | 6/2003 | Gao ............................ 709/220 |
| 6,640,249 B1 | * | 10/2003 | Bowman-Amuah ......... 709/228 |

* cited by examiner

Primary Examiner—St. John Courtenay, III
(74) Attorney, Agent, or Firm—Leon R. Turkevich

(57) ABSTRACT

A synthetic code book document type definition (DTD) is generated that identifies selected compression codes, based on specifying code-book extensible markup language (XML) tags having semantics defined according to a generic code book document type definition (DTD). The compression codes are used to compress API commands, defined by second XML tags having semantics defined by a generic API DTD, into synthesized data. The synthesized data and the code-book XML tags are supplied to a destination device configured for storing the generic code book DTD and the generic API DTD, enabling the destination device to synthesize a code book for recovery of the API commands from the synthesized data.

50 Claims, 5 Drawing Sheets

GENERIC CODE BOOK COMPRESSION FOR XML BASED APPLICATION PROGRAMMING INTERFACES

BACKGROUND OF THE INVENTION

1. Field of the Invention

The present invention relates to implementation of text-based applications programming interfaces that provide data compression for communication of protocols between two devices via a bandwidth-limited channel.

2. Description of the Related Art

Networking communications is based on establishment of a communications protocol between two devices for transfer of information via a communications channel. The communications protocol established between the two devices enables these two devices to optimize communication based on the characteristics of the communications channel, where a receiver can recover data transmitted by the transmitter. As illustrated by the Open Systems Interconnect (OSI) reference model, devices typically are implemented utilizing several "layers" (i.e., "levels") of communications protocols, where each communication protocol layer is configured for executing a corresponding communication protocol based on a corresponding prescribed set of commands. Such layering of prescribed communications protocols has enabled communications of different application processes across a common transmission medium. The commands for a given communication protocol may be collectively referred to as an applications programming interface (APIs).

Different types of APIs have been defined for different communications protocols. One type of API is a binary API, which has the advantage of providing a precise and compressed interface.

FIG. 1A is a diagram illustrating a conventional binary protocol, where a "packet" 10 generated according to a specified protocol interface includes a first 1-bit field 12a, followed by a second 3-bit field 12b, followed by a third 4-bit field 12c. The binary protocol used to generate the packet 10 provides a precise interface in that the location of each information element 12 is well defined. The binary protocol used to generate the packet 10 also provides a relatively high compression level, enabling three information elements 12a, 12b, and 12c to share a single data byte 14. An example of a binary protocol is the Ethernet (IEEE 802.3) protocol.

Binary interfaces suffer from the disadvantage of a lack of flexibility and a lack of readability by a programmer. In particular, the information element 12a composed of a single bit allows only two states; hence, a desire to add a third state to the information element 12a would require either a complete redefinition of the byte 14, or addition of a second byte 16 to accommodate the added state.

Another popular format for APIs are ASCII (text) based interfaces, illustrated in FIG. 1B. Exemplary text-based interfaces include POP3, SMTP, HTTP, HTML, XML, and SIP. As illustrated in FIG. 1B, a text-based document 20 includes a tag 22 specifying prescribed attributes 24 having specified values 26. The structure of the document 20 enables data to be arranged in any order, and enables different operations to be specified based on adding tags. The tags may be have predetermined attributes such as found with HTML, or the tags may have extensible attributes defined by referenced document type descriptors (DTDs) as found in XML.

Hence, text-based APIs provide flexibility and extensibility for future applications. However, text-based APIs require a substantially larger data size (i.e., a larger number of bytes) to store the same information as otherwise required for a binary API; in particular, several bytes are required for transfer of the text information, often resulting in a size expansion of 20 to 1 compared to binary APIs. The larger data byte requirements for text-based APIs significantly limit the ability to use text-based APIs via bandwidth-limited channels, for example wireless data channels.

One approach to reduce the data size of information involves link layer compression, for example V.42 is compression as utilized in modems and wireless devices. The V.42 compression is a general purpose compression algorithm that is applied "transparently" (i.e., independent of higher layer protocol operations) to all data traffic that flows across the communication channel. The V.42 compression algorithm dynamically builds a "code book" of symbols that are relevant to all the protocols (i.e., APIs) that it transports during a communication session. In particular, the V.42 compression algorithm builds the code book as the data stream is compressed; hence, the V.42 compression algorithm must communicate the code book in its entirety to its peer on the communication link to enable the data stream to be decompressed. Consequently, the necessity of sending a new code book for each communication session results in a loss of available bandwidth for the protocol information.

Another problem associated with implementation of APIs in a device involves the memory consumption for storage of the respective sets of executable source code. In particular, an API typically is implemented by loading a unique set of executable source code for the API into the device. For example, if a device supports an HTTP service, a Telnet service, an FTP service and a Voice Gateway service, where each service utilizes a different corresponding protocol and a corresponding communications port, then each service would be implemented by loading and executing a corresponding unique set of executable source code for the corresponding protocol. Hence, implementation of multiple APIs requires memory space for each of the respective sets of executable source code.

SUMMARY OF THE INVENTION

There is a need for an arrangement that enables a transmitting network device, for example a mobile wireless telephone or a base station, to establish a protocol interface with a peer network device via a communications channel, where the protocol interface is implemented using text-based applications programming interfaces and having effective compression that minimizes bandwidth utilization of the communications channel.

There also is a need for an arrangement that enables a transmitting network node to transmit, via a communications channel, compressed data for a text-based protocol and generated based on compression codes from a code book, where the transmitting network node transmits descriptors enabling a receiving network node to reconstruct the code book.

There also is a need for an arrangement that enables a transmitting network node to support multiple protocols by utilizing respective APIs implemented based on shared attributes, enabling memory requirements for execution of the APIs to be reduced.

These and other needs are attained by the present invention, where a synthetic code book is used to identify compression codes applied to API commands for generation of synthesized data. The synthetic code book is specified by code-book tags having semantics defined according to a generic code book document type definition (DTD). The API commands are based on semantics defined by a generic API DTD. The synthesized data and the code-book tags are supplied to a destination device configured for storing the generic code book DTD and the generic API DTD, enabling the destination device to synthesize a code book for recovery of the API commands from the synthesized data.

Hence, the destination device can recover the API commands from the synthesized data based on the synthesized code book, eliminating the necessity of supplying an entire code book during each communication session.

In addition, memory requirements for execution of the APIs can be reduced, based on the generic API DTD. In particular, the inventors have realized that communications protocols (e.g., HTTP, Telnet, FTP, Voice Gateway) have similar "macroscopic" (i.e., logical) properties, including a set of commands which must be selected from, a set of procedures to execute for each command, a specific set of states the protocol may encounter, etc. Hence, these similar macroscopic properties, which are shared among the different protocols, can be realized by the generic API DTDs, which serve as a "generic code set" that can be shared across all the APIs stored in a device. In other words, the generic API DTDs serve as a "meta-API" language that can be used to define APIs. Hence, the semantics of each API can be realized by the generic API DTDs, minimizing the code space required to implement the APIs.

One aspect of the present invention provides a method in a source device of supplying an application programming interface (API) command to a destination device via a communications channel. The method includes specifying the API command using first tags having semantics defined based on a generic API document type definition (DTD), and compressing the first tags using selected compression codes to generate compressed data. The method also includes synthesizing a synthetic DTD, identifying the selected compression codes, by specifying second tags having semantics defined by a generic code book DTD, and transmitting the compressed data and the second tags via the communications channel. Hence, the compressed data and the second tags enable the destination device to synthesize the synthetic DTD based on the second tags and a stored copy of the generic code book DTD, for synthesis of the API command by decompressing the first tags and based on a stored copy of the generic API DTD.

Another aspect of the present invention provides a method in a destination device of receiving an application programming interface (API) command from a source device via a communications channel. The method includes storing a generic API document type definition (DTD) and a generic code book DTD, and receiving, from the source device, compressed data and first tags having semantics defined based on the generic code book DTD. The method also includes first synthesizing a synthetic DTD based on the first tags and the generic code book DTD, and second synthesizing second tags based on decompressing the compressed data according to the synthetic DTD, the second tags having semantics defined based on the generic API DTD. The API command is executed based on interpreting the second tags based on the generic API DTD.

Hence, API commands used for communication of a text-based protocol can be transferred to a destination device based on synthesizing a synthetic DTD using received first tags having semantics defined based on a generic code book DTD stored in the destination device. Hence, API commands can be transferred to a destination device, providing protocol flexibility without compromising the communications channel bandwidth.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1A:
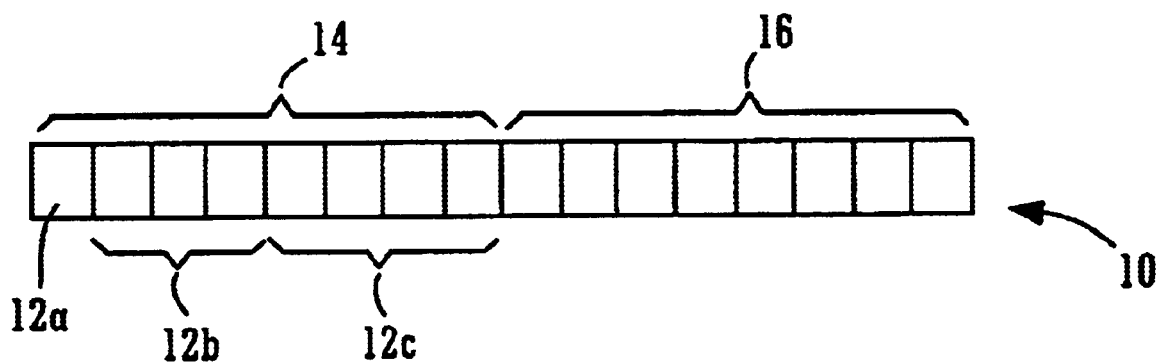
FIGS. 1A and 1B are diagrams illustrating conventional (Prior Art) binary APIs and text-based APIs.
Figure 1B:
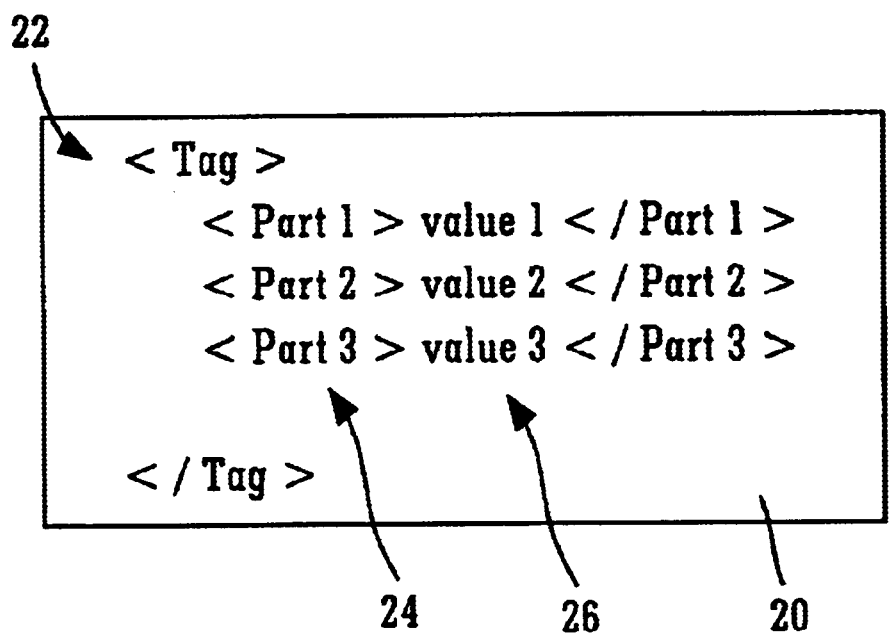
Figure 2:
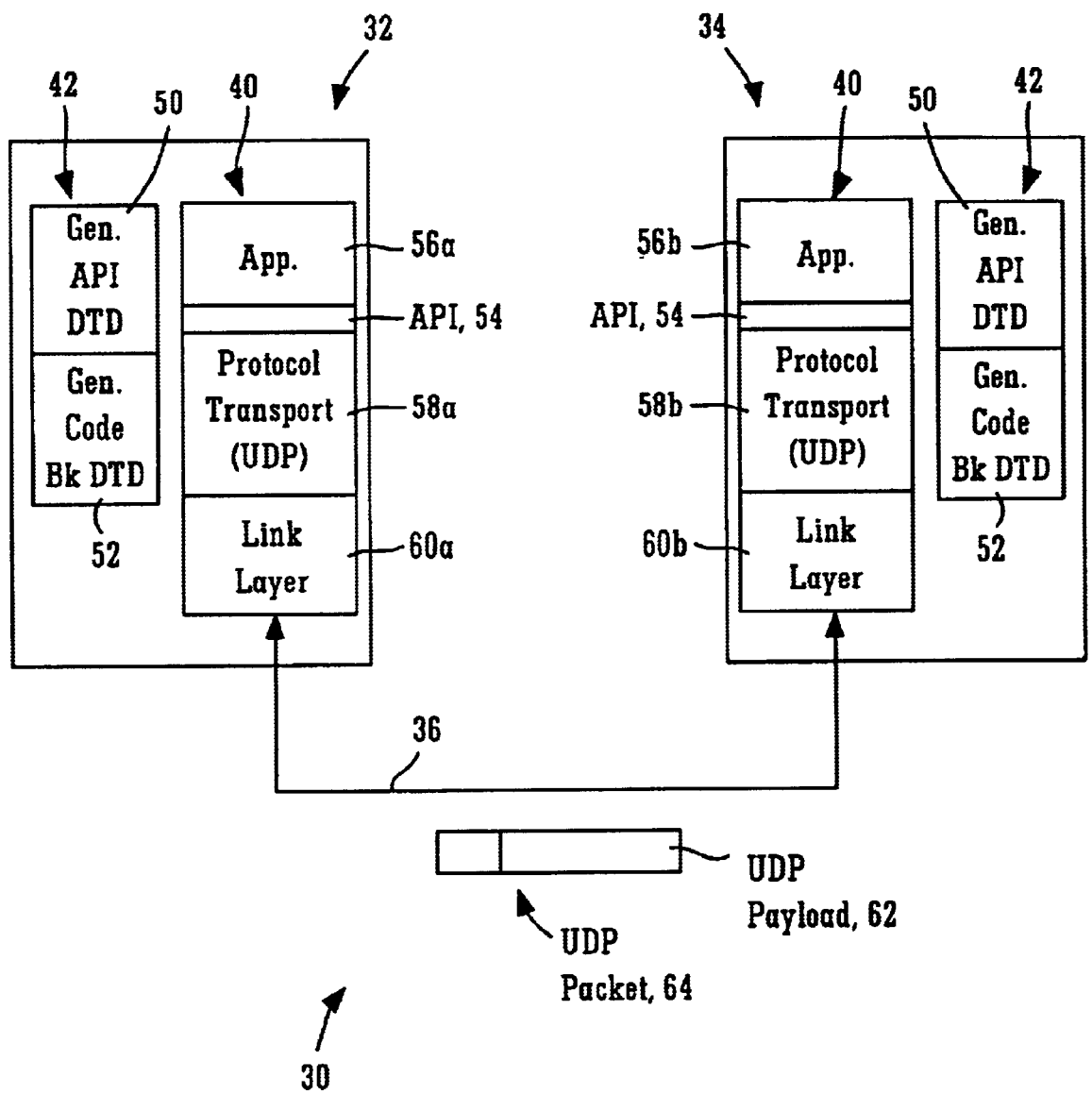
FIG. 2 is a block diagram illustrating a communications system including a source device and a destination device configured for exchanging compressed text-based protocol APIs defined in XML, according to an embodiment of the present invention.

FIG. 2 is a block diagram illustrating a communications system 30 having a source device 32 and a destination device 34 configured for exchanging compressed text-based protocol application programming interface (API) commands defined using extensible markup language (XML), according to an embodiment of the present invention. The source device 32 and the destination device 34 may be implemented as peer devices configured for communications by a communications channel 36, for example a wired or wireless communications channel 36 according to a prescribed protocol.

An exemplary implementation of the communications system 30 includes a mobile wireless system, where a router 32 is configured for establishing an interface with a cellular mobile station 34. The communications channel 36 may be implemented using various physical layer protocols; for example, the channel 36 may be implemented using an RS232 link, a Bluetooth 1.0 compatible link, a GSM 07.10 compatible link, etc. As described below, the devices 32 and 34 communicate protocol information by using a UDP datagram interface for device abstraction.

The source device 32 and the destination device 34 each include a processor portion 40 configured for executing protocol operations, described below, and a device memory 42 configured for storing data for use by the processor portion 40. In particular, the device memory 42 is configured for storing (in nonvolatile memory) document type definitions (DTDs) that are used for defining XML tags utilized by the processor portions 40. XML is a "meta-meta" language, in other words a language for defining meta-languages. The World Wide Web consortium (W3C) has defined document definitions as XML documents that are used to define the semantic attributes of XML tags (i.e., elements).

The inventors have realized that the properties of document type definitions can be exploited to synthetically construct document type definitions that can be used as specialized code books to provide dynamic, protocol specific compression. In particular, document type definitions are able to inherit definitions from other DTDs; for example, a DTD for currency can be defined, and that DTD used to define currency can be extended by writing a new DTD referencing the original DTD and that specifies new types of currency that were not originally specified in the original DTD. Hence, an XML document can include a document type declaration that refers to either DTD, or both.

In addition, XML provides a mechanism to derive synthetic elements by dynamically constructing the meaning of an element. For example, a DTD may specify that an XML element is to be assigned a default value, to be specified as a required value, etc. A subsequent XML tag, specified within an XML page or another DTD may then modify the default value as needed. The ability to inherit DTD definitions, in combination with the ability to derive synthetic XML elements by dynamically constructing the attributes of the element, enables an XML document to be used to synthetically construct a DTD in order to construct the syntax of the original XML document.

Hence, the inventors have utilized XML as a meta-protocol language (i.e., a meta-language to specify a protocol), where implementation of the protocol is accomplished by specifying a given API command using XML tags having semantics defined by API DTDs. In addition, the XML tags that define the API command are compressed for transport via the communications channel 36 using prescribed compression techniques, where the compression codes are identified in a synthetic code book DTD semantically defined by generic code book DTDs; hence, the synthetic code book DTD, defined by code-book XML tags that are semantically defined by generic code book DTDs, can be synthesized by the destination device 34 by transmitting the code-book XML tags to the destination device. Hence, the destination device can decompress the XML tags that define the API command without transfer of the entire code book that specifies the decompression parameters.

As illustrated in FIG. 2, an executable application 56a initiates a protocol command in the source device 32 by referencing an API command 54. The processor portion 40 also generates in application runtime a protocol transport layer, implemented for example as a UDP-based transport layer. The protocol transport layer 58, in response to the application 56a referencing the API command 54, generates API XML tags that describe the API command 54 based on the API DTDs 50, stored in the device memory 42. The API XML tags that describe the API command 54 are then compressed, for example, by a link layer module 60 that generates synthetic data (i.e., compressed data) representing the compressed XML tags based on selected compression codes. The compression codes are identified by a synthetic code book DTD, based on code book XML tags that describe the synthetic code book DTD based on generic code book DTDs 52, stored in the device memory 42. The code book DTD 52 defines semantics for XML tags used for specifying compression attributes for compression operations.

Hence, the protocol transport layer 58a generates API XML tags that describe the API command 54 based on the API DTDs 50; the link layer 60a compresses the API XML tags into compressed data (i.e., synthetic data) using selected compression codes identified by a synthetic code book DTD, where the synthetic code book DTD is defined by code book XML tags semantically defined by the generic code book DTDs. Hence, the synthetic data can be transported as a UDP payload 62 of a UDP datagram 64 to the destination device 34.

Reception of the UDP datagram 64 by the destination device 34, along with the code book XML tags, enables the destination device 34 to synthetically reconstruct the API command 54. In particular, the link layer 60b decompresses the payload 62 based on synthetic reconstruction of the synthetic code book DTD; the synthetic code book DTD is synthesized based on the code book XML tags semantically defined by the locally-stored generic code book DTDs 52. The link layer 60b can then synthetically reconstruct the API XML tags that define the API command 54; the protocol transport layer 58b synthetically reconstructs the API command 54 by interpreting the API XML tags relative to the locally-stored generic API DTDs, enabling the application process 56b to respond to the API command executed by the protocol transport layer 58b.

Figure 3:
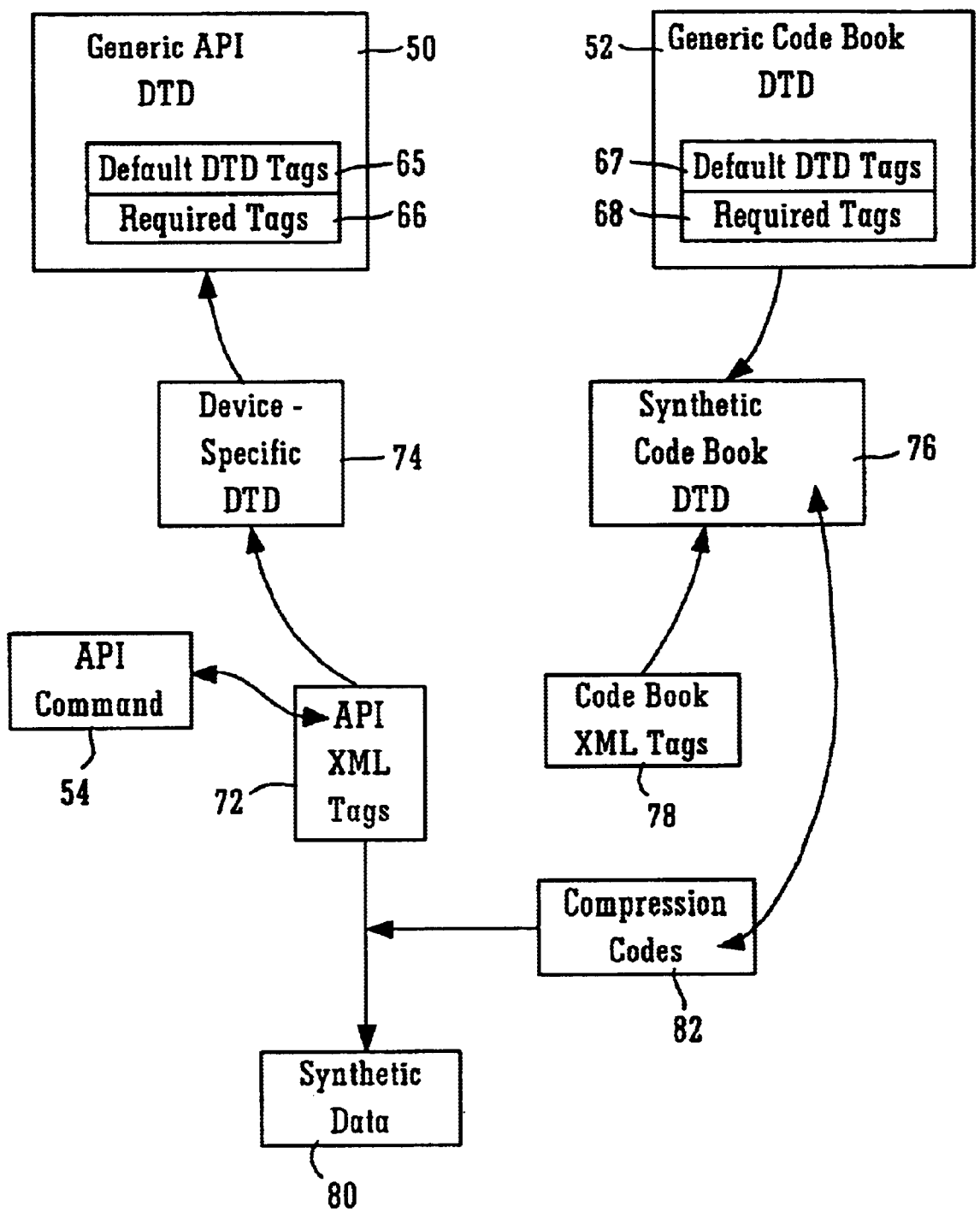
FIG. 3 is a diagram illustrating synthesis of synthetic document type descriptors for code book compression of an API command specified XML tags, according to an embodiment of the present invention.

FIG. 3 is a block diagram illustrating the structure of DTDs and their relationship to the UDP payload 62 for each API command 54 sent by the source device 32 to the destination device 34. In particular, the actual meta-structure of each API command 54 that may be referenced by an application resource 56 is defined within a generic API DTD 50. The generic API DTD 50 defines the semantics for all API XML tags 72 used in describing the API commands, and includes all attributes necessary for synthetic construction; for example, one XML element 65 may specify a default value to be implied for a given attribute if no value is specified by any API XML tag 72; another XML element 66 may specify that a specified attribute is required to have a specified value by one of the API XML tags 72, or by synthetic generation by the executable runtime of the protocol transport layer 58b. Hence, API XML tags 72 can be generated having XML-defined attributes that are syntaxically defined and semantically applied, based on the generic API DTDs 50.

In addition, additional device specific DTDs 74 may be utilized, where the device specific DTD 74 includes device specific tags that defines semantics for interpreting the API XML tags 72 for a specific device type; in this case, the device specific DTDs 74 inherit the syntax and attributes from the generic API DTD 50.

The generic code book DTD 52 specifies the semantics for code book XML tags 78 used to identify attributes for code book compression. For example, the generic code book 52 may include elements that specify symbol representations, prescribed bit patterns, compression algorithm attributes, etc., and may include default elements 67 and/or required elements 68. As described above with respect to elements 65 and 66, the default element 67 specifies default values to be implied for a given attribute if no value is specified by any code book XML tag 78; the required element 68 specifies that a specified attribute is required to be specified, either by a code book XML tag 78 or by runtime execution of the link layer 60b.

During compression operations by the protocol transport layer 58a, the protocol transport layer 58 synthesizes a synthetic code book DTD 76 by generating code book tags 78 that define the synthetic code book DTD 76 based on the generic code book DTD 52; the synthetic code book DTD specifies the compression codes 82 used for the compression of the API XML tags 72 into the synthetic data 80 for insertion into the UDP payload 62. The insertion of the synthetic data 80 into the UDP packet 64 may further be specified by an API which can likewise be specified by a "nested DTD" that encapsulates the synthetic data 80 into a UDP packet 64.

In particular, nesting in XML is performed by "scoping" data within brackets, where the data is derived from the ontology of terms within the nesting level, and includes any meanings derived from the ontological nesting. Use of this recursive nesting technique enables any protocol stack (illustrated by ISO models) to be translated into a nested set of DTD/XML documents.

For example, a "device specific" XML/DTD code book may be utilized for the physical layer of the protocol (e.g., Bluetooth wireless protocol); another "unreliable connectionless transport" XML/DTD code book may be utilized for an unreliable connectionless transport protocol 58 such as UDP; another XML/DTD code book may be utilized for the application layer protocol 56. Hence, each protocol layer can have a corresponding set of DTDs, code books, etc., enabling each protocol layer to generate synthetic documents. Consequently, as the API command passes, for example, from the application layer 56 to the API transport layer 54, to the connectionless transport layer 58, to the device transport layer 60, each protocol layer can further encapsulate, compress, and synthetically refine the original document.

Hence, the transmission of the UDP packet 62 and the code book XML tags 78 enables the destination device 34 to synthetically generate the synthetic code book DTD 76; hence, the code book XML tags 78 represent the minimum amount of information necessary to transmit via the communication channel 36 in order to enable the destination device 34 to decompress the API XML tags 72 the synthetic data 80 for synthetic reconstruction of the API command.

Figure 4A:
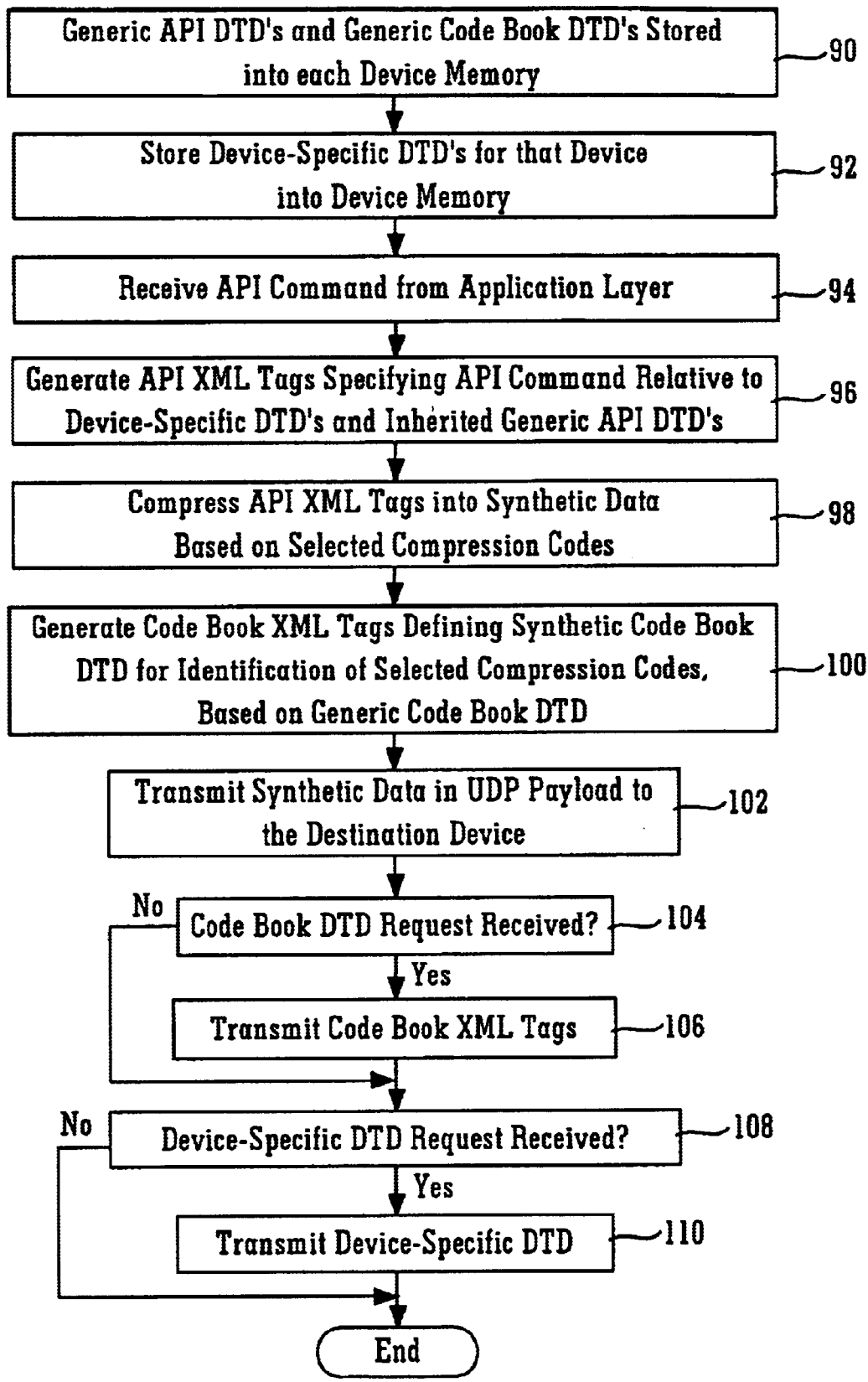
FIGS. 4A and 4B are diagrams illustrating the methods of transmitting and receiving API commands based on code book compression, according to an embodiment of the present invention.
Figure 4B:
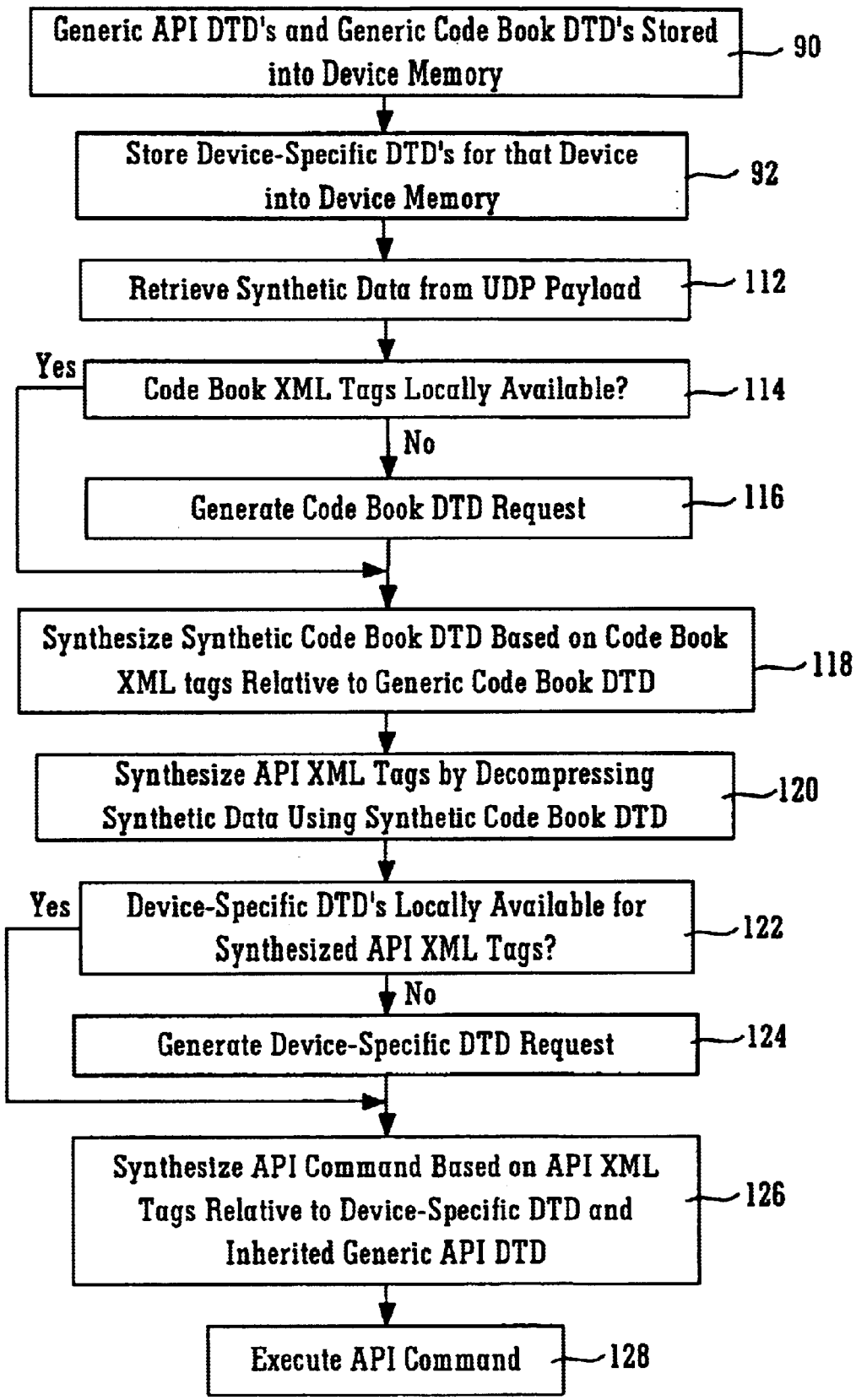

FIGS. 4A and 4B are diagrams summarizing methods of supplying and receiving the API commands by the source device 32 and the destination device 34, respectively, based on code book compression according to an embodiment of the present invention. The steps described in FIGS. 4A and 4B can be implemented as executable code stored on a computer readable medium (e.g., a hard disk drive, a floppy drive, a random access memory, a read only memory, an EPROM, a compact disc, etc.).

The method begins in step 90 of FIG. 4A, where the generic API DTD's 50 and the generic code book DTD's 52 are stored in the device memory 42 of each of the devices 32 and 34. The DTD's 50 and 52 may be loaded during initial configuration of the devices 32 and 34, or during reprogramming, for example during uploading of updated programming; however, the generic API DTD's 50 and the generic code book DTD's 52 also may be fetched from a Uniform Resource Identifier (URI) specified during execution of an API that references a DTD specified to be located at the specified URI. Such DTDs in XML convention are referred to as a "here now document", where the "here now document" is embedded within the first API command or at another URL where it may be fetched (note that according to the disclosed embodiment, the protocol to fetch the DTD also may be compressed).

Once the destination device 34 (or the source device 32) has fetched the referenced DTD (e.g., the generic code book DTD), the device 34 caches the referenced DTD. In addition, synthetic DTDs may be cached by the destination device 34, based on available memory resources. Note that the destination device 34 (or the source device 32) also may employ predictive caching of DTDs. In particular, the destination device 34 (or the source device 32), in response to detecting prescribed conditions that may require a specific DTD (e.g., execution of a prescribed protocol having a prescribed set of APIs that reference specific DTDs), may prefetch the specific DTD in anticipation of execution of an API that requires the prefetched DTD.

Exemplary API DTD's may be used to specify operations such as information requests (having specified attributes including request type, destination unit identifiers, timeout values, etc.), registration requests (having specified attributes including registration status, destination unit identifier, registration location, etc.). Exemplary generic code book DTDs may specify base coding parameters (e.g., compression base, symbol value, symbol magnitude, etc.).

Each device 32 and 34 also has its corresponding device-specific DTD 74 loaded into its device memory 42 in step 92; for example, a wireless modem or wireless telephony device may be loaded with device-specific DTD's that specify operations such as signal strength (having specified attributes including unit identifier, signal strength, current Received Signal Strength Indicator (RSSI) value) Bit Error Rate, Connection Status, etc. Note that use of the device-specific DTD 74 may be optional, depending on the nature of the generic API DTDs 50 used to define the API XML tags 72.

Once the generic API DTDs 50, the generic code book DTDs 52, and (optionally) the device-specific DTD 74 have been loaded into the device memory 42, the source device 32 is able to begin transmission of API commands 54 based on code book compression. The protocol transport layer 58a receives in step 94 an API command 54 from the application layer 56a, and in response generates in step 96 API XML tags 72. The API XML tags 72 specify the API command 54 according to the semantic definitions of the device-specific DTD's 74 and the inherited generic API DTD's 50.

The link layer 60a compresses in step 98 the API XML tags 72, based on selected compression codes 82, to generate synthetic data 80 for insertion into a UDP payload 62. The link layer 60a generates in step 100 code book XML tags 78 that are used to define the synthetic code book DTD 76 based on the generic code book DTD 52. In particular, the code book XML tags 78, semantically defined by the generic code book DTD 52, provide the minimum information necessary to synthetically define the synthetic code book 76, including required values specified by any required DTD tag 68, and any modifier values to modify default values that may be implied by the destination device 34 using a default DTD tag 67. Hence, the code book XML tags 78 enable the destination device 34 to synthesize the synthetic code book DTD 76 to identify the selected compression codes necessary to decompress the synthetic data 80.

The link layer 60a then transmits the synthetic data 80 within the UDP payload 62 to the destination device 34 in step 102. If in step 104 the link layer 60a receives a code book DTD request from the destination device 34, for example at the beginning of a communications session, the link layer 60a transmits in step 106 the code book XML tags 78, enabling the destination device 34 to synthesize the synthetic code book DTD 76. Once the destination device 34 has synthesized the synthetic code book DTD 76, the synthetic data 80 can be decompressed to recover the API XML tags 72.

If in step 108 the link layer 60a receives a device-specific DTD request, for example based on the destination device 34 detecting an updated revision, the link layer 60a transmits in step 110 the device-specific DTD 74, enabling the destination device 34 to interpret the API XML tags 72 based on the supplied device-specific DTD's 74 and the stored generic API DTD's 50.

FIG. 4B is a diagram illustrating the method by the destination device 34 of reconstructing and executing the API command 54 from the synthetic data 80 supplied by the UDP payload 62 based on code book compression. Assuming the destination device 34 has been loaded with the necessary DTD's 50, 52, and 74 in steps 90 and 92, the link layer 60b retrieves in step 112 the synthetic data 80 from the UDP payload 62, and determines in step 114 whether the code book XML tags 78 are locally available, for example in a local cache maintained during establishment of the communications channel 36. If the code book XML tags 78 are not locally available, the link layer 60b generates and transmits in step 116 a code book DTD request to the source device 32.

Once the code book XML tags 78 are locally available, the link layer 60b synthesizes in step 118 the synthetic code book DTD 76 based on the code book XML tags 78 relative to the generic code book DTD 52; for example, the link layer 60b synthetically generates the synthetic code book DTD 76 by applying default values implied by the default DTD tags 67 and that are not specified by the XML code book tags 78, and by retrieving from the XML code book tags 78 any required values specified by the required DTD tags 68. The synthetic code book DTD 76 synthesized by the link layer 60b specifies the selected compression codes utilized by the link layer 60a in step 98 in FIG. 4A.

The link layer 60b then decompresses (i.e., synthesizes) in step 120 the API XML tags 72 by decompressing the synthetic data 80 using the synthetic code book DTD 76. If in step 122 the device-specific DTD's 74 for interpreting the API XML tags 72 are not locally available, the protocol transport layer 58b generates in step 124 a device-specific DTD request. Once the device-specific DTD's 74 are locally available, the protocol transport layer 58b synthesizes the API command 54 based on applying the API XML tags 72 relative to the device-specific DTD 74 and the inherited generic API DTD 50 in step 126. The API command 54 can then be executed by the destination device 34 in step 128.

According to the disclosed embodiment, code book compression is applied to text-based application programming interface (API) commands, where synthetic code book DTD's can be synthetically generated based on code book XML tags relative to generic code book DTD's, minimizing the amount of information necessary to be transmitted to a destination device. Hence, text based APIs can be utilized while utilizing the features of compression based on binary APIs.

It will become readily apparent that different modifications may be made to the disclosed embodiment in practicing the invention. For example, the use of XML may be modified by applying another markup language relying on inherited document type definitions, for example a new markup language derived from Standard Generalized Markup Language (SGML) and utilizing DTDs. In addition, the implementation of operations such as generating the API XML tags, the code book XML tags, and/or the synthetic generation of the synthetic code book DTD, may be carried out by different executable resources within the device.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a source device of supplying an application programming interface (API) command to a destination device via a communications channel, the method comprising:

specifying the API command using first tags having semantics defined based on a generic API document type definition (DTD);

compressing the first tags using selected compression codes to generate compressed data;

synthesizing a synthetic DTD, identifying the selected compression codes, by specifying second tags having semantics defined by a generic code book DTD; and transmitting the compressed data and the second tags via the communications channel, enabling the destination device to synthesize the synthetic DTD based on the second tags and a stored copy of the generic code book DTD, for synthesis of the API command by decompressing the first tags and based on a stored copy of the generic API DTD.

2. The method of claim 1, wherein the first and second tags are extensible markup language (XML) tags, the synthesizing step including second specifying within the second tags a first attribute tag configured for modifying a prescribed attribute value specified by the generic code book DTD, and a second attribute tag having a generated value specified as mandatory by the generic code book DTD and generated based on runtime execution of an executable resource in the source device.

3. The method of claim 2, wherein the specifying step includes generating a device specific DTD having device specific tags that define semantics for interpreting the first tags for execution of the API command by the destination device, the generating step including generating the device specific DTD based on the generic API DTD.

4. The method of claim 3, wherein the specifying step further includes:

generating the first tags according to the device specific DTD and based on runtime execution of an application resource in the source device; and third specifying within the first tags a third attribute tag configured for modifying a second prescribed attribute value specified by the generic API DTD, and a fourth attribute tag having a second generated value specified as mandatory by the generic API DTD.

5. The method of claim 3, wherein the transmitting step includes transmitting the compressed data as a payload of a UDP packet.

6. The method of claim 3, wherein the transmitting step includes transmitting the device specific tags to the destination device for synthesis of the API command from the first tags.

7. The method of claim 6, wherein the transmitting step includes transmitting the second tags and the device specific tags in response to a DTD request from the destination device.

8. A method in a destination device of receiving an application programming interface (API) command from a source device via a communications channel, the method comprising:

storing a generic API document type definition (DTD) and a generic code book DTD;

receiving, from the source device, compressed data and first tags having semantics defined based on the generic code book DTD;

first synthesizing a synthetic DTD based on the first tags and the generic code book DTD;

second synthesizing second tags based on decompressing the compressed data according to the synthetic DTD, the second tags having semantics defined based on the generic API DTD; and executing the API command based on interpreting the second tags based on the generic API DTD.

9. The method of claim 8, wherein the first and second tags are extensible markup language (XML) tags, the first synthesizing step including identifying within the first tags a first attribute tag configured for modifying a prescribed attribute value specified by the generic code book DTD, and second attribute tag configured for specifying a second value specified as mandatory by the generic code book DTD.

10. The method of claim 8, wherein the second synthesizing step includes recovering a device specific DTD having device specific tags that define semantics for interpreting the second tags for execution of the API command.

11. The method of claim 10, wherein the second synthesizing step further includes identifying within the second tags a third attribute tag configured for modifying a prescribed attribute value specified by the generic code book DTD, and a fourth attribute tag that specifies a third value specified as mandatory by the generic code book DTD.

12. The method of claim 10, further comprising sending a DTD request for the first tags and the device specific tags.

13. The method of claim 8, further comprising sending a DTD request for the first tags.

14. A source device configured for supplying an application programming interface (API) command to a destination device via a communications channel, the source device comprising:

a device memory configured for storing a generic API document type definition (DTD) and a generic code book DTD;

a processor configured for:
(1) generating first tags for specifying the API command and having semantics defined based on the generic API DTD,
(2) generating compressed data by compressing the first tags using selected compression codes,
(3) synthesizing a synthetic DTD, identifying the selected compression codes, by specifying second tags having semantics defined by a generic code book DTD; and a network interface configured for outputting the compressed data and the second tags via the communications channel, enabling the destination device to synthesize the synthetic DTD based on the second tags and a stored copy of the generic code book DTD, for synthesis of the API command by decompressing the first tags and based on a stored copy of the generic API DTD.

15. The source device of claim 14, wherein the processor is configured for generating the first and second tags as extensible markup language (XML) tags, the second tags including a first attribute tag configured for modifying a prescribed attribute value specified by the generic code book DTD, and a second attribute tag having a generated value specified as mandatory by the generic code book DTD and generated based on runtime execution of an executable resource by the processor.

16. The source device of claim 15, wherein the processor is configured for generating a device specific DTD having device specific tags that define semantics for interpreting the first tags for execution of the API command by the destination device, the processor generating the device specific DTD based on the generic API DTD.

17. The source device of claim 16, wherein the processor is configured for generating the first tags according to the device specific DTD and based on runtime execution of an application resource.

18. The source device of claim 16, wherein the network interface is configured for outputting the compressed data as a payload of a UDP packet.

19. The source device of claim 16, wherein the processor is configured for sending the second tags to the destination device via the network interface in response to a DTD request from the destination device.

20. A destination device configured for receiving an application programming interface (API) command from a source device via a communications channel, the destination device comprising:

a device memory configured for storing a generic API document type definition (DTD) and a generic code book DTD;

a network interface configured for receiving from the source device compressed data and first tags having semantics defined based on the generic code book DTD; and a processor configured for:
(1) first synthesizing a synthetic DTD based on the first tags and the generic code book DTD,
(2) second synthesizing second tags based on decompressing the compressed data according to the synthetic DTD, the second tags having semantics defined based on the generic API DTD, and
(3) executing the API command based on interpreting the second tags based on the generic API DTD.

21. The destination device of claim 20, wherein the first tags and second tags are extensible markup language (XML) tags, the processor configured for synthesizing the synthetic DTD based on identifying within the first tags a first attribute tag configured for modifying a prescribed attribute value specified by the generic code book DTD, and second attribute tag configured for specifying a second value specified as mandatory by the generic code book DTD.

22. The destination device of claim 21, wherein the processor is configured for recovering, from decompressing the compressed data, a device specific DTD having device specific tags that define semantics for interpreting the second tags for execution of the API command.

23. The destination device of claim 22, wherein the processor is configured for sending a DTD request for the first tags and the device specific tags.

24. The destination device of claim 20, wherein the processor is configured for sending a DTD request for the first tags.

25. A computer readable medium having stored thereon sequences of instructions for supplying an application programming interface (API) command by a source device to a destination device via a communications channel, the sequences of instructions including instructions for performing the steps of:

specifying the API command using first tags having semantics defined based on a generic API document type definition (DTD);

compressing the first tags using selected compression codes to generate compressed data;

synthesizing a synthetic DTD, identifying the selected compression codes, by specifying second tags having semantics defined by a generic code book DTD; and transmitting the compressed data and the second tags via the communications channel, enabling the destination device to synthesize the synthetic DTD based on the second tags and a stored copy of the generic code book DTD, for synthesis of the API command by decompressing the first tags and based on a stored copy of the generic API DTD.

26. The medium of claim 25, wherein the first and second tags are extensible markup language (XML) tags, the synthesizing step including second specifying within the second tags a first attribute tag configured for modifying a prescribed attribute value specified by the generic code book DTD, and a second attribute tag having a generated value specified as mandatory by the generic code book DTD and generated based on runtime execution of an executable resource in the source device.

27. The medium of claim 26, wherein the specifying step includes generating a device specific DTD having device specific tags that define semantics for interpreting the first tags for execution of the API command by the destination device, the generating step including generating the device specific DTD based on the generic API DTD.

28. The medium of claim 27, wherein the specifying step further includes:
generating the first tags according to the device specific DTD and based on runtime execution of an application resource in the source device; and
third specifying within the first tags a third attribute tag configured for modifying a second prescribed attribute value specified by the generic API DTD, and a fourth attribute tag having a second generated value specified as mandatory by the generic API DTD.

29. The medium of claim 27, wherein the transmitting step includes transmitting the compressed data as a payload of a UDP packet.

30. The medium of claim 27, wherein the transmitting step includes transmitting the device specific tags to the destination device for synthesis of the API command from the first tags.

31. The medium of claim 30, wherein the transmitting step includes transmitting the second tags and the device specific tags in response to a DTD request from the destination device.

32. A computer readable medium having stored thereon sequences of instructions for receiving by a destination device an application programming interface (API) command from a source device via a communications channel, the sequences of instructions including instructions for performing the steps of:
storing a generic API document type definition (DTD) and a generic code book DTD;
receiving, from the source device, compressed data and first tags having semantics defined based on the generic code book DTD;
first synthesizing a synthetic DTD based on the first tags and the generic code book DTD;
second synthesizing second tags based on decompressing the compressed data according to the synthetic DTD, the second tags having semantics defined based on the generic API DTD; and
executing the API command based on interpreting the second tags based on the generic API DTD.

33. The medium of claim 32, wherein the first and second tags are extensible markup language (XML) tags, the first synthesizing step including identifying within the first tags a first attribute tag configured for modifying a prescribed attribute value specified by the generic code book DTD, and a second attribute tag configured for specifying a second value specified as mandatory by the generic code book DTD.

34. The medium of claim 32, wherein the second synthesizing step includes recovering a device specific DTD having device specific tags that define semantics for interpreting the second tags for execution of the API command.

35. The medium of claim 34, wherein the second synthesizing step further includes identifying within the second tags a third attribute tag configured for modifying a prescribed attribute value specified by the generic code book DTD, and a fourth attribute tag that specifies a third value specified as mandatory by the generic code book DTD.

36. The medium of claim 34, further comprising instructions for performing the step of sending a DTD request for the first tags and the device specific tags.

37. The medium of claim 32, further comprising instructions for performing the step of sending a DTD request for the first tags.

38. A source device configured for supplying an application programming interface (API) command to a destination device via a communication channel, the source device comprising:
means for specifying the API command using first tags having semantics defined based on a generic API document type definition (DTD);
means for compressing the first tags using selected compression codes to generate compressed data;
means for synthesizing a synthetic DTD, identifying the selected compression codes, by specifying second tags having semantics defined by a generic code book DTD; and
means for transmitting the compressed data and the second tags via the communications channel, enabling the destination device to synthesize the synthetic DTD based on the second tags and a stored copy of the generic code book DTD, for synthesis of the API command by decompressing the first tags and based on a stored copy of the generic API DTD.

39. The device of claim 38, wherein the first and second tags are extensible markup language (XML) tags, the synthesizing means configured for specifying within the second tags a first attribute tag configured for modifying a prescribed attribute value specified by the generic code book DTD, and a second attribute tag having a generated value specified as mandatory by the generic code book DTD and generated based on runtime execution of an executable resource in the source device.

40. The device of claim 39, wherein the specifying means is configured for generating a device specific DTD having device specific tags that define semantics for interpreting the first tags for execution of the API command by the destination device, the device specific DTD generated based on the generic API DTD.

41. The device of claim 40, wherein the specifying means is configured for:
generating the first tags according to the device specific DTD and based on runtime execution of an application resource in the source device; and
specifying within the first tags a third attribute tag configured for modifying a second prescribed attribute value specified by the generic API DTD, and a fourth attribute tag having a second generated value specified as mandatory by the generic API DTD.

42. The device of claim 40, wherein the transmitting means is configured for transmitting the compressed data as a payload of a UDP packet.

43. The device of claim 40, wherein the transmitting means is configured for transmitting the device specific tags to the destination device for synthesis of the API command from the first tags.

44. The device of claim 43, wherein the transmitting means is configured for transmitting the second tags and the device specific tags in response to a DTD request from the destination device.

45. A destination device configured for receiving an application programming interface (API) command from a source device via a communications channel, the destination device comprising:

means for storing a generic API document type definition (DTD) and a generic code book DTD;

means for receiving, from the source device, compressed data and first tags having semantics defined based on the generic code book DTD;

means for first synthesizing a synthetic DTD based on the first tags and the generic code book DTD;

means for second synthesizing second tags based on decompressing the compressed data according to the synthetic DTD, the second tags having semantics defined based on the generic API DTD; and means for executing the API command based on interpreting the second tags based on the generic API DTD.

46. The device of claim 45, wherein the first and second tags are extensible markup language (XML) tags, the first synthesizing means configured for identifying within the first tags a first attribute tag configured for modifying a prescribed attribute value specified by the generic code book DTD, and a second attribute tag configured for specifying a second value specified as mandatory by the generic code book DTD.

47. The device of claim 45, wherein the second synthesizing means is configured for recovering a device specific DTD having device specific tags that define semantics for interpreting the second tags for execution of the API command.

48. The device of claim 47, wherein the second synthesizing means is configured for identifying within the second tags a third attribute tag configured for modifying a prescribed attribute value specified by the generic code book DTD, and a fourth attribute tag that specifies a third value specified as mandatory by the generic code book DTD.

49. The device of claim 47, further comprising means for sending a DTD request for the first tags and the device specific tags.

50. The device of claim 45, further comprising means for sending a DTD request for the first tags.

* * * * *